Figure 1:
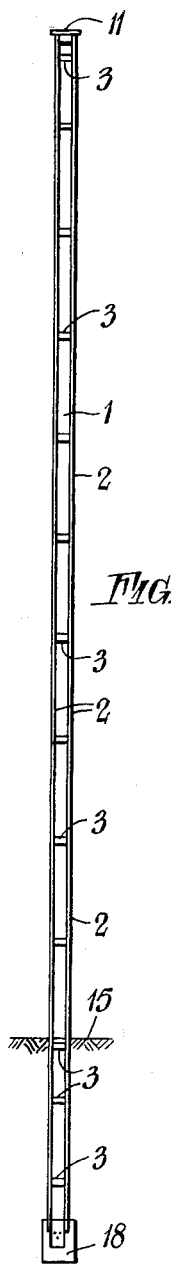

May 16, 1961   J. L. NOCK   2,984,322
POLE AND LIKE STRUCTURES FOR THE SUPPORT OF ELECTRIC
TRANSMISSION LINES AND OTHER PURPOSES
Filed July 8, 1953   3 Sheets-Sheet 1

Inventor
James Lee Nock
by Sommers & Young
Attorneys

May 16, 1961　　　J. L. NOCK　　　2,984,322
POLE AND LIKE STRUCTURES FOR THE SUPPORT OF ELECTRIC
TRANSMISSION LINES AND OTHER PURPOSES
Filed July 8, 1953　　　　　　　　　　　　3 Sheets-Sheet 2
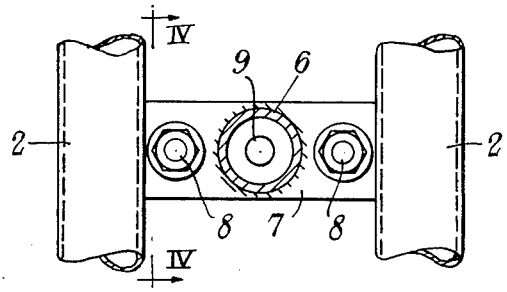
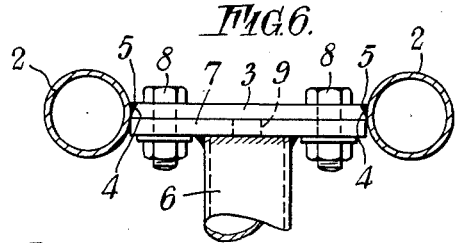
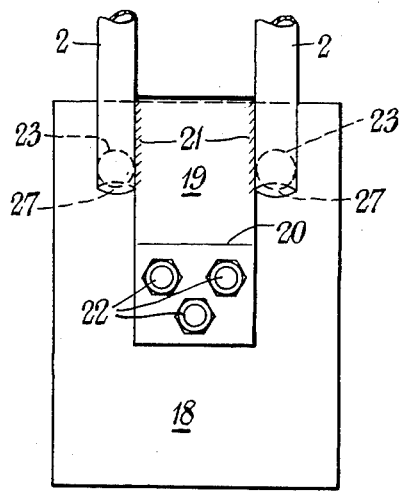
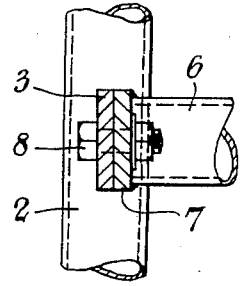
Inventor
James Lee Nock
by Sommers + Young
Attorneys May 16, 1961
J. L. NOCK
2,984,322
POLE AND LIKE STRUCTURES FOR THE SUPPORT OF ELECTRIC
TRANSMISSION LINES AND OTHER PURPOSES
Filed July 8, 1953
3 Sheets-Sheet 3
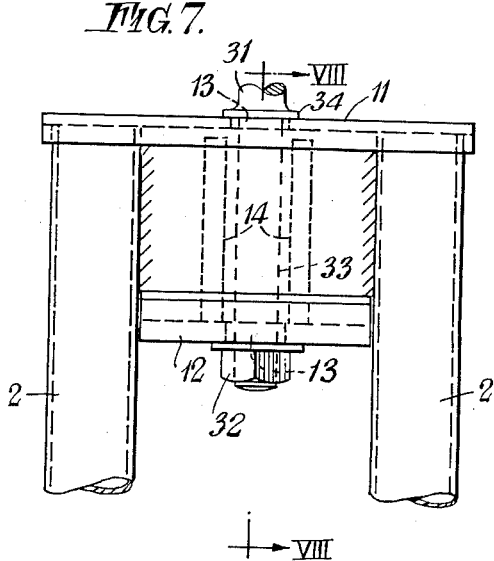
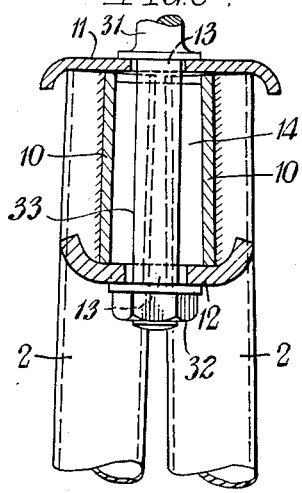
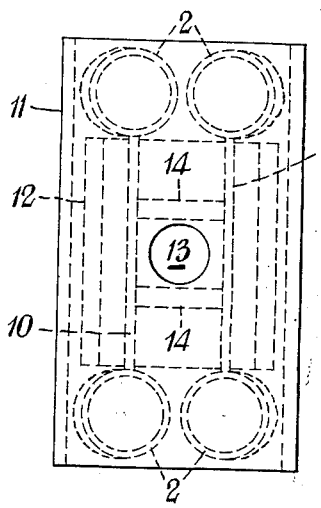
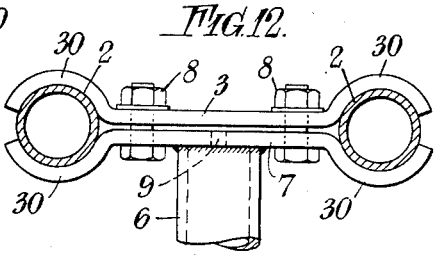
Inventor
James Lee Nock
by Sommers & Young
Attorneys United States Patent Office 2,984,322
Patented May 16, 1961

2,984,322
POLE AND LIKE STRUCTURES FOR THE SUPPORT OF ELECTRIC TRANSMISSION LINES AND OTHER PURPOSES

James Lee Nock, Hereford, England, assignor to Painter Brothers Limited, Hereford, England Filed July 8, 1953, Ser. No. 366,785

Claims priority, application Great Britain July 21, 1952

5 Claims. (Cl. 189—23)

This invention relates to openwork poles or like structures and one of its objects is to provide a construction of simple and economical nature yet possessing desirable strength. Another object of the invention is to provide an improved construction of the poles or the like in the part thereof which in use lies below ground.

The structures of the invention may be advantageously adapted to the requirements of supporting electric transmission lines but could be applied for the overhead support of other equipment.

According to the present invention, an openwork metal pole or like structure for use in vertical position comprises a plurality of legs each embodying two or more tubular main members connected each to another at spaced points along the same by horizontal cross members, the legs being connected to one another by braces extending between said cross members.

The cross members are suitably secured to the main members of the legs by welding or clamping and an advantageous construction is to bevel or recess them at the ends to form spaces between such ends and the adjacent main members for reception of weld metal.

The braces are preferably horizontal and may comprise tube or other sections welded to end members in H or I fashion, the construction being such that these end members may be bolted to the cross members to secure the braces and may, if desired, give the cross-members a composite form.

At the top, the legs of the pole or the like may be connected to one another by use of a brace member or members extending between main members of each leg and suited to serve for the fixing of a cap or cover for the upper ends of the tubular main members of the legs. This fixing may be effected through the intermediary of a locking member or plate bearing beneath said brace member or members and a bolt or the like operative to clamp the cap or cover and locking member or plate in position. For this clamping, the lower end of the spindle of an electric insulator may be used when the pole is to serve for the support of an electric transmission line or lines.

According to another feature of the invention, the legs are constructed to present substantially a V formation at the lower end, and to have their main members connected at the lower extremities to a vertically disposed thrust member in the form of a metal plate, a second thrust member of block form, suitably comprised by a baulk of timber or precast concrete, being fitted to one or other of the legs adjacent to the top of the V formation.

In such a case, the bracing of the pole or the like by the horizontal cross members and the braces may be continued substantially down to the lower end of the V formation, and preferably the lower ends of the main members are connected to the vertically disposed thrust member by a pair of converging plates in such a manner that a portion of these plates is left free between the lower extremities of the main members and a portion of said pair of plates which serves for connection thereof to such thrust member. Suitably, the second thrust member is fitted on one or the other side of the pole or the like adjacent to the top of the V formation of the legs by means of J-bolts.

Figure 2:
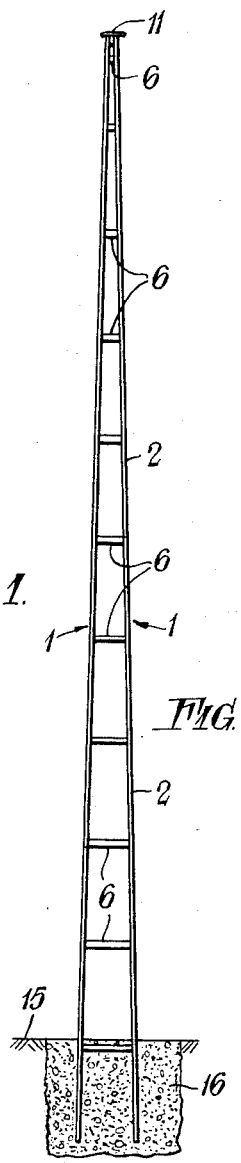
Figure 10:
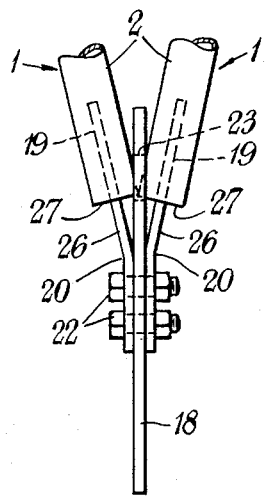
Figure 3:
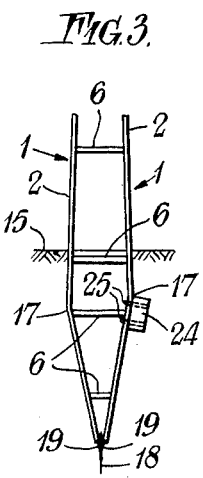

In order to enable the invention to be readily understood, reference is directed to the accompanying drawings in which:

Figure 1 is an elevation of a first example of pole in accordance with the present improvements, Figure 2 is an elevation of a second example of pole of the invention, this view being taken at right-angles to the view shown in Figure 1, Figure 3 is a fragmentary elevation of the lower part of the pole of Figure 1, the view being taken at right-angles to the view shown in Figure 1, Figures 4 and 5 are fragmental sectional elevations viewed at right-angles to each other, and Figure 6 is a sectional plan, illustrating the construction of the cross members and braces of the above examples of pole to a larger scale than Figures 1 to 3, Figure 7 is a fragmentary elevation to a similar larger scale of the top structure of the pole of the above examples, Figure 8 is a section on the line VIII—VIII of Figure 7, Figure 9 is a plan view of such top structure, Figure 10 is a fragmentary elevation, to a larger scale than Figures 1 and 3, of the lower extremity of the first example of pole of the invention, Figure 11 is a side view of Figure 10, and Figure 12 is a view, similar to Figure 6, of a modification.

The examples of pole illustrated in the drawings are intended to serve as light poles for support of an overhead electric transmission line. The example shown in Figures 1 and 3 differs from that shown in Figure 2 in that it comprises different lower end structure hereinafter described, but in all other respects the two examples are similar. Both examples comprise two legs 1, 1. Each leg 1 embodies as main members a pair 2, 2 of straight galvanised steel tubes (hereinafter referred to as leg tubes) disposed parallel to each other. The legs 1 are splayed apart from each other from the top to ground level somewhat like the legs of a narrow and tall letter A, see Figure 2. At intervals along their length the leg tubes 2, 2 of each leg are connected together by horizontal cross members 3 which, as shown in Figures 4 to 6, are constituted by pieces of flat steel bar. At their ends, these cross members 3 are bevelled or chamfered as shown at 4 in Figure 6, to form spaces between such ends and the adjacent leg tubes 2, 2 to receive weld metal 5. As will be realised, the bevelling enables these cross members 3 to be welded at 5 to the leg tubes from one side and in such a manner as to enable the weld to be galvanised satisfactorily on completion thereof. The splaying apart of the legs 1 is disposed transversely to the line and the degree of splaying and the length of the horizontal cross members 3 connecting the leg tubes 2, 2 together may be varied to give a wide range of moments of inertia transversely to the axis of the pole. The two legs 1 are connected together by braces 6, extending horizontally between the cross members 3. As shown in Figures 4 to 6, these braces 6 comprise short steel tube sections (or they may be other steel sections), having welded to them at the ends, in H or I fashion, pieces of flat steel bar 7 of similar dimensions to the cross members 3 except that they are not bevelled at the ends. In heavier designs of the pole, these end members 7 may be stiffened by addition thereto of fins. The braces 6 are secured between the cross members 3 of the legs by bolts 8 passed through their end members 7 and the adjacent cross members 3. Drainage holes 9 for galvanising the braces 6 may be provided in the end members 7 at each end of the tube sections and the latter may be of the same diameter and bore as the leg tubes. It will be understood that the horizontal braces 6 between the legs 1 provide for adequate support of the legs in all directions in conjunction with the horizontal cross members 3 connecting the leg tubes 2, 2 of the respective legs, so that the strut length of the legs at the braces may be considered to be substantially equal to the length of the centre lines of the braces.

It will be seen from Figures 7 to 9 that, at the top of the pole, the pairs of leg tubes 2, 2 are connected together by a pair of further cross members 10, 10, lying in the same plane as the axes of the tubes of each pair and welded to such tubes. These cross members 10 serve for the fixing of a cap or cover 11 for the upper ends of the several leg tubes 2. This cap or cover is of rectangular form and has downwardly curved edges on opposite sides as shown in Figure 8. It prevents entry of moisture into the upper end of the leg tubes and serves for the support of an insulator (not shown) for carrying the transmission line. In order to secure the cover 11, and likewise the insulator, in place a locking member 12 in the form of a rectangular plate curved upwardly at opposite sides (Figure 8) is adapted to bear beneath the pair of cross members 10 and to fit between the two legs, cf. Figures 7 and 9. Both the cap or cover 11 and the locking member or plate 12 are located in position by their curved side edges. They are centrally holed at 13 for the passage of the insulator spindle 31 (shown only in Figures 7 and 8) and on tightening the usual nut 32 on the lower end 33 of the spindle the cap or cover 11 and the locking member or plate 12 are clamped in position by the nut and the spindle flange 34. The locking member or plate 12 may have upwardly extending legs 14 on opposite sides of its central hole 13 for fitting between the pair of cross members 10, 10. It will be seen that these legs 14 are tapered to the slope of the leg tubes so that, as the nut on the insulator spindle is tightened, the taper is driven tighter between the two plates 10. Altogether, the construction is able effectively to prevent relative movement between the tops of the two legs 1 of the pole and also to provide similar support for the tops of the leg tubes of each leg as will be apparent. It is also of advantage to arrange one of the cross members 3 and brace combinations 6, 7 near the top of the pole for a similar purpose, cf. Figures 1 and 2. Alternatively, the two cross members 10 at the top of the pole may be joined by members (e.g. as at 14) welded to the cross members to provide a unitary brace member serving the same purpose.

As above indicated, in the example of pole shown in Figures 1 and 3, the construction of the lower end of the pole is different from that shown in Figure 2 wherein the legs 1, below ground level indicated at 15, are simply embedded in a concrete foundation 16. According to the first example, Figures 1 and 3, the legs are bent inwardly at points 17 situated a short distance below ground level 15, so that at the lower end the legs present a V formation shown in Figure 3. The horizontal cross members 3 of the two legs and the braces 6 extending between them are continued below ground and into the V formation, so that the legs 1 are braced together substantially from top to bottom. At the extreme lower end, the pole comprises a vertically disposed thrust member 18 in the form of a simple flat metal plate, see also Figures 10 and 11. This metal plate extends between the two legs and beyond them on each side and it is comparatively deep in height. The main members or leg tubes 2, 2 of the two legs are connected to the said metal thrust plate through the intermediary of a pair of converging plates 19 which at the lower end are bent at 20 so that in end view, Figure 10, they together present a sort of Y form with the metal thrust plate 18 between them. As will be seen from Figure 11, these converging plates 19 are each as wide as the distance between the two leg tubes 2, 2 of each leg and on their upper side-edge parts at 21 they are welded to the respective leg tubes. They terminate at the top at about the level of the upper end of the thrust plate 18 and at their lower part are clamped by bolts 22 to the central portion of the thrust plate 18 on either side thereof. In order that in the V formation, the leg tubes 2, 2 of each leg may be brought as close as possible to those of the other leg, their lower extremities may extend at one side into holes 23 in the thrust plate. This example of the pole, as shown in Figure 3, further comprises a second thrust member 24, or so-called kicking block, in the form of a baulk of timber or precast concrete which is secured by J-bolts 25 to the leg tubes 2, 2 of one of the legs 1 on one side or the other of, and at about the upper end of, the V formation of the legs. It is so secured as to extend substantially equally above and below a cross member 3 and brace 6 of the adjacent leg and it lies parallel to the plane of the leg at the bent lower end part thereof.

It will be realised that the first-mentioned or lower thrust member 18, made in the form of a flat metal plate, simplifies excavation work and, moreover, provides a certain degree of flexibility which is an advantage having regard to the stresses to which openwork, or as they are sometimes called, skeleton or lattice type, poles or like structures are subjected in use. At the same time the upper thrust member 24 provides appropriate substantially rigid support to the pole or the like at a point near below ground level 15. Another advantage of the metal plate form of lower thrust member 18 is that it allows the main members 2, 2 on opposite sides of such member to be brought approximately close together at their lower extremities while permitting of connecting them with this thrust member by a free portion 26 of the converging plates 19 to enhance the flexibility of the lower end structure to a desirable degree. The connection of the upper thrust member or kicking block 24 to the adjacent leg tubes 2, 2 by J-bolts 25 is a desirable simplification of the mounting of this member and entails no weakening of the leg tubes.

Further advantages of the below-ground structure of the first example are that the design permits the leg tubes 2, 2, to be completely alike in detail, i.e. interchangeable from side to side of the pole, that the structure may be galvanised for maximum protection against corrosion and that the open ends of the leg tubes 2, 2 at 27, Figures 10 and 11, will permit casual moisture inside the tubes to drain off into the surrounding soil.

According to the modification shown in Figure 12, the cross-members 3, instead of being welded to the leg tubes 2 as aforesaid, are clamped in position on the tubes. For this purpose they, and the end members 7 of the braces 6, have part-circular end-parts 30 to embrace the leg tubes. When the bolts 8 are tightened up, the cross-members, and likewise the braces, are clamped in position as will be understood. In effect, the parts 3 and 9 together might be said to constitute the cross-members in this case, providing what may be termed a composite form of cross-members.

The pole or like structure of the invention lends itself to fabrication from standardised parts. The improvements are not limited, however, to the examples above particularly described because further modifications are possible without departing from the scope of the invention. For example, poles or the like embodying more than two legs may be constructed in similar manner with appropriate modification of the horizontal cross members and braces and other parts where necessary. Moreover, by suitable modification, a variety of poles from light constructions to relatively heavy ones may be made, and so on.

Obviously, the pole or like structure may, in appropriate cases, be fitted with cross-arms to carry electric transmission lines or other equipment.

I claim:
1. An openwork metal pole or like metal structure for use in vertical position, comprising two legs each of which embodies two metal main members spaced apart from each other, said main members extending substantially from the top to the bottom of said structure, a series of substantially flat cross members extending horizontally between said main members of each leg at spaced points therealong and with their ends connected to such main members, said cross members being at similar levels in both of said legs, a series of metal braces having fixed T-wise at extremities thereof substantially flat end members which co-operate with the cross members between the upper and lower end of the structure, means for rigidly though detachably securing said end members face to face to such cross members with the braces extending horizontally between points central of the length of such corresponding cross members, and means connecting the two legs together at the upper end of the structure comprising a pair of the cross members in the form of flat metal plates each welded at its opposite ends to the two spaced-apart main members of a leg and each disposed in a plane containing the axes of the two main members of the respective legs, a metal cover plate extending over the upper ends of the several main members of said two legs in engagement with those ends, a metal locking plate extended beneath and in contact with the lower ends of said pair of cross members, and a bolt or the like extended through central bolt holes in said cover and locking plates and clamping these plates in position.

2. A structure according to claim 1, wherein the main members of one of the legs converge inwardly towards the main members of the other leg at their lower end portions to present substantially a V formation at the lower end of the structure and a pair of the cross members in the form of metal plates are each welded between said lower end portions of the main members of a leg and each having an inclined portion in line with the converging plane of each leg and a bent lower vertical portion so that the two plates converge in a Y-form, a vertically disposed thrust member in the form of a metal plate being held between the lower portions of such cross members, and means detachably connecting together said lower portions of such cross members and said thrust member.

3. A structure according to claim 2, wherein the cross members between the upper and lower ends of the structure are connected to said main members by welding.

4. A structure according to claim 2, wherein the cross members between the upper and lower ends of the structure are connected to said main members by clamping the main members between end parts of the cross members and opposed end parts of the brace end members, the means for securing said end members face to face to such cross members providing the clamping force.

5. An openwork metal pole or like metal structure for use in vertical position, comprising two legs each of which embodies two metal main members spaced apart from each other, said main members extending substantially from the top to the bottom of said structure, the main members of one of the legs converging inwardly towards the main members of the other leg at their lower end portions to present substantially a V formation at the lower end of the structure, a series of substantially flat cross members extending horizontally between said main members of each leg at spaced points therealong and with their ends connected to such main members, said cross members being at similar levels in both of said legs, a series of metal braces having fixed T-wise at extremities thereof substantially flat end members which co-operate with the cross members between the upper and lower ends of the structure, means for rigidly though detachably securing said end members face to face to such cross members with the braces extending horizontally between points central of the length of such corresponding cross members, a pair of the cross members in the form of metal plates being each welded between said lower end portions of the main members of a leg and each having an inclined portion in line with the converging plane of each leg and a bent lower vertical portion so that the two plates converge in a Y-form, a vertically disposed thrust member in the form of a metal plate held between the lower portions of such cross members, and means detachably connecting together said lower portions of such cross members and said thrust member.

References Cited in the file of this patent

UNITED STATES PATENTS

| | | |
|---|---|---|
| 391,164 | La Mothe | Oct. 16, 1888 |
| 687,200 | Conger | Nov. 26, 1901 |
| 694,888 | Pfluger | Mar. 4, 1902 |
| 816,900 | Collet | Apr. 3, 1906 |
| 1,035,431 | Ericson | Aug. 13, 1912 |
| 1,658,535 | Neilson | Feb. 7, 1928 |
| 2,194,810 | Reiner | Mar. 26, 1940 |

FOREIGN PATENTS

| | | |
|---|---|---|
| 132,079 | France | July 29, 1879 |
| 309,103 | Italy | 1933 |
| 158,110 | Austria | Mar. 11, 1940 |